2,891,248

HEXAHYDROTETRALIC ESTERS, THEIR PREPARATION AND THEIR USES

Anastasie Partchevsky, Lyon, and Ernest Evieux, Le Peage-de-Roussillon, France, assignors to Societe des Usines Chimiques Rhone-Poulenc, Paris, France, a French body corporate No Drawing. Application April 30, 1956
Serial No. 581,279

Claims priority, application France May 5, 1955

3 Claims. (Cl. 260—468)

This invention relates to the production and uses of hexahydrotetralic esters and more particularly to the production and uses of specific neutral esters of hexahydrotetralic acid.

Hexahydrotetralic acid may be obtained as the cis-acid or the trans-acid or as a mixture of the two and all these forms are included in the present specification within the expression "hexahydrotetralic acid." It may be produced by the processes described in Beilstein, Handbuch der Organischen Chemie, 2nd supplement to volume 9, page 532, or by hydrogenation of the sodium salt of tetralic acid and liberation of the hexahydrotetralic acid from its sodium salt by a strong acid. Tetralic acid is itself prepared from naphthalene, which is a starting material available in great quantity on the market, by methods known per se.

According to the present invention there are provided new neutral esters of hexahydrotetralic acid, being the neutral n-hexyl and 2-ethylhexyl esters of tetralic acid, of important commercial utility as hereinafter set forth.

According further to the invention, these neutral hexahydrotetralates are prepared by esterification at boiling point of a mixture of hexahydrotetralic acid and of an excess of n-hexyl alcohol or 2-ethylhexyl alcohol, in the presence of a dehydration catalyst (for example sulphuric acid) and of an azeotropic vehicle for the water formed, such as benzene.

The neutral n-hexyl and 2-ethylhexyl hexahydrotetralates are light-yellow oils which are insoluble in water but soluble in the usual organic solvents. They boil at about 220° C. under 10 mm. Hg.

It has been found that these esters constitute good plasticisers for polyviyl chloride, and they may be used as plasticisers in the manner usually employed for plasticising polyvinyl chloride e.g. the powdered polyvinyl chloride, the plasticiser, a stabiliser and if desired loading agents or pigments are mixed or malaxated. The proportion of plasticiser employed depends upon the properties which it is desired to impart to the finished product, and it may generally vary between 25% and 40% of the total mass. A mass is obtained which may vary in appearance according to the respective proportions of each of the constituents. For example, with 35% of plasticiser it has the appearance of a greasy powder. On passing this powder over the cylinders of a rolling machine, at 130–140° C., smooth, flexible and translucent sheets are obtained. Examination of the physico-chemical properties of these sheets, such as the mechanical properties, water resistance, resistance to extreme cold and electrical properties, shows that these two plasticisers are clearly superior to neutral octyl phthalate, which is one of the best known plasticisers for polyvinyl chloride.

The polyvinyl chloride sheets thus plasticised can be used for the manufacture of articles of all kinds, as intermediate layers in manufactured articles, as self-supporting films, sheets or ribbons, as materials for coating wood, metals, woven fabrics or papers, as materials for use in the manufacture of sheathings for cables and as floor tiles.

The following examples in which the parts are by weight, will serve to illustrate the invention but are not to be regarded as limiting the invention in any way:

EXAMPLE I

*Preparation of neutral hexyl hexahydrotetralate*

Into a spherical flask provided with a thermometer well and with a decantation system for the separation of water there were introduced, in the following order:

|  | Parts |
|---|---|
| Normal hexyl alcohol (B.P. $_{755\ mm.}$ 158° C.) | 130 |
| Hexahydrotetralic acid (M.P. 136° C.) | 75 |
| Benzene | 265 |
| Pure sulphuric acid (66° Bé.) | 5 |

The mixture was heated, the binary water-benzene mixture formed being distilled, while the benzene was recycled into the flask. The water was decanted in the separator. After 7 hours, 12 parts of water (compared with a theoretical yield of 13.5 parts) had been extracted.

The homogeneous mass contained in the flask had an amber tint. It was mixed with 250 parts of water and 265 parts of benzene, the mixture was agitated and the water was decanted, carrying with it the greater part of the sulphuric acid. The product was then washed with a 10% sodium carbonate solution (150 cc.) and rinsed with water. The benzene solution was then neutral. Finally, the product was dried over sodium sulphate and distilled. There were obtained:

38 parts of recovered hexyl alcohol, and
95 parts of neutral n-hexyl hexahydrotetralate, B.P. 222–225° C. under 9–10 mm. Hg.

The ester thus obtained is a pale yellow oil $D_{25}=0.980$; $n_D^{26}=1.4570$, which is insoluble in water but readily soluble in the common organic solvents. Its electrical properties were as follows:

Resistivity at 20° C. __1.6 × $10^{11}$ ohms/cm.²/cm.
Tan δ _____0.017 } for a frequency of 1 mc./s.
K _____4.4

EXAMPLE II

*Preparation of neutral 2-ethylhexyl hexahydrotetralate*

Into a spherical flask provided with a thermometer well and with a decantation system for the separation of water there were introduced, in the following order:

|  | Parts |
|---|---|
| 2-ethylhexyl alcohol | 200 |
| Hexahydrotetralic acid | 75 |
| Benzene | 265 |
| Sulphuric acid (66° Bé.) | 5 |

The mixture was heated, the binary water-benzene mixture formed being distilled. The water was decanted in the separator, while the benzene was recycled into the flask. After 7 hours, 11.5 parts of water (compared with a theoretical yield of 13.5 parts) had been extracted.

The homogeneous mass contained in the flask, which had a light amber tint, was mixed with 250 parts of water and 180 parts of benzene. The mixture was agitated, the water was decanted, carrying with it the greater part of the sulphuric acid, and the product was then washed with 150 cc. of a 10% sodium carbonate solution and rinsed with water. The washing with sodium carbonate and rinsing was repeated if necessary to produce a neutral benzene solution.

The product was decanted and dried over anhydrous sodium sulphate and then distilled.

There were extracted:

78 parts of recovered 2-ethylhexyl alcohol, and
96 parts of neutral 2-ethylhexyl hexahydrotetralate, B.P. 230–235° under 10–12 mm. Hg.

The product thus obtained is a very light yellow oil of $D_{24}=0.960$ and $n_D^{26}=1.4595$, which is substantially insoluble in water, but readily soluble in the common organic solvents.

Its electrical properties were as follows:

Resistivity at 20°C... $2.8 \times 10^{11}$ ohms/cm.$^2$/cm.
Tan δ ............ 0.0033 } for a frequency of 1 mc./s.
K ............... 4.2

EXAMPLE III

*Mass plasticised with neutral n-hexyl hexahydrotetralate*

Into a mixture of: 65 parts of powdered polyvinyl chloride of medium viscosity, and 1.5 parts of lead stearate, previously placed in a mortar, were dropped, in a stream, 35 parts of neutral n-hexyl hexahydrotetralate prepared as in Example I. The mass was intimately mixed until a greasy powder was obtained. The mass was fed to the cylinders of a rolling machine the cylinders being at 135° C. The mixture melted and was rolled for 5 minutes to homogenise it. A sheet was obtained, which was allowed to cool.

This sheet had the following properties:

Percent elongation in the direction
 of its length ................... 31%.
Breaking load per sq. mm. ...... 1.220 kg.
Behaviour in the cold .......... Withstands −40° C.

EXAMPLE IV

*Mass plasticised with neutral 2-ethylhexyl hexahydrotetralate*

Into a mixture of: 65 parts of powdered polyvinyl chloride of medium viscosity, and 1.5 parts of lead stearate, previously placed in a mortar, were dropped, in a stream, 35 parts of neutral 2-ethylhexyl hexahydrotetralate prepared as in Example II. The mass was intimately mixed until a greasy powder was obtained, which was fed on to the cylinders of a rolling machine the cylinders being at 135° C. The mixture melted and was rolled for 5 minutes to homogenise it. A sheet was obtained, which was allowed to cool.

This sheet had the following properties:

Percent elongation in the direction
 of its length ................... 286%.
Breaking load per sq. mm. ...... 1.150 kg.
Behaviour in the cold .......... Withstands −30° C.

Hexahydrotetralic acid, referred to herein is the compound of the formula

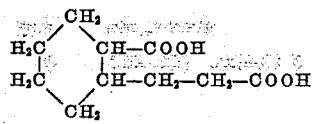

We claim:

1. A compound selected from the class consisting of the neutral n-hexyl and 2-ethylhexyl esters of hexahydrotetralic acid.
2. Neutral hexahydrotetralic n-hexyl ester.
3. Neutral hexahydrotetralic 2-ethylhexyl ester.

References Cited in the file of this patent

UNITED STATES PATENTS

| | | |
|---|---|---|
| 2,189,722 | Winans | Feb. 6, 1940 |
| 2,275,034 | Moyle | Mar. 3, 1942 |
| 2,449,959 | Standinger | Sept. 21, 1948 |
| 2,489,103 | Morris et al. | Nov. 22, 1949 |
| 2,570,038 | Smith et al. | Oct. 2, 1951 |
| 2,575,011 | Fraser | Nov. 13, 1951 |
| 2,679,509 | Hasselstrom | May 25, 1954 |
| 2,790,788 | Kamlet | Apr. 30, 1957 |

OTHER REFERENCES

Beilstein, 9, 532 (1949).